United States Patent
Redko et al.

(10) Patent No.: US 7,498,817 B2
(45) Date of Patent: Mar. 3, 2009

(54) METHOD OF NONDESTRUCTIVE TIGHTNESS TESTING BASED ON GAS DISCHARGE VISUALIZATION

(75) Inventors: Volodymyr Redko, Coral Springs, FL (US); Elena Shembel, Coral Springs, FL (US); Peter Novak, Fort Lauderdale, FL (US)

(73) Assignee: Emerize Corporation, Coral Springs, FL (US)

( * ) Notice: Subject to any disclaimer, the term of this patent is extended or adjusted under 35 U.S.C. 154(b) by 0 days.

(21) Appl. No.: 10/897,551

(22) Filed: Jul. 23, 2004

(65) Prior Publication Data

US 2005/0082339 A1    Apr. 21, 2005

(30) Foreign Application Priority Data

Jul. 25, 2003    (UA)    ............... 2003077007

(51) Int. Cl.
*G01N 27/62* (2006.01)
*G01M 3/00* (2006.01)

(52) U.S. Cl. .................. 324/464; 324/536; 73/40.7
(58) Field of Classification Search ............ 324/536, 324/464, 460
See application file for complete search history.

(56) References Cited

U.S. PATENT DOCUMENTS

| | | | | |
|---|---|---|---|---|
| 4,147,431 A | * | 4/1979 | Mann | ........................ 356/72 |
| 6,314,796 B1 | * | 11/2001 | Wittekind et al. | ............ 73/49.2 |
| 2004/0144163 A1 | * | 7/2004 | Kram et al. | .................. 73/40.7 |

FOREIGN PATENT DOCUMENTS

SU    1021965 A  *  6/1983

* cited by examiner

*Primary Examiner*—Vincent Q. Nguyen
*Assistant Examiner*—John Zhu (57) ABSTRACT

A method of nondestructive noncontact tightness testing of inner structure of articles based on gas discharge visualization includes the steps of providing a film for imaging on a dielectric plate and an electrode, the dielectric plate disposed on the electrode, and polarizing the dielectric plate by applying a series of high voltages pulses across the dielectric to provide a preliminary polarized dielectric plate. After the polarizing step, an article to be tested which has a multi-layer casing including an outer metallic layer is arranged on the film. The article is then subjected to a high voltage pulsed electric field by applying a high voltage electrical pulse between the electrode and the outer metallic layer and the electrode, wherein the pulsed electric field is combined with an electric field associated with the preliminary polarized dielectric plate triggers a gas discharge process. An image of the film is obtained on the film of an inner structure of the article based on the gas discharge process.

5 Claims, 6 Drawing Sheets

Tangential component of the electric field on the dielectric surface (V/m)

METHOD OF NONDESTRUCTIVE TIGHTNESS TESTING BASED ON GAS DISCHARGE VISUALIZATION

CROSS-REFERENCE TO RELATED APPLICATIONS

This application claims the benefit of Ukranian Application No. 2003077007, filed on Jul. 25, 2003, now Ukranian Patent No. 64623 issued on Apr. 15, 2005, the entirety of which are incorporated herein by reference.

STATEMENT REGARDING FEDERALLY SPONSORED RESEARCH OR DEVELOPMENT

N/A

FIELD OF INVENTION

The invention relates to seal integrity determination, hermeticity determination, or tightness testing, and more specifically to the use of high voltage discharge visualization for determination of packaging or jacket seal integrity, and can be used for nondestructive testing of the quality of weld seams in articles that contain a working medium welded into a metallized dielectric casing.

BACKGROUND OF THE INVENTION

Methods for determining the seal integrity, or seal tightness, or hermeticity of a test article, wherein a closed space is formed in the testing zone that is formed by the outer surface of the article and a transparent electrode, has been disclosed. In this method, the test article and the electrode are subjected to a difference of potentials that corresponds to the threshold value of gas discharge formation, and the inner surface of the article. The article is bathed by a test gas that diffuses through the fault into the closed space causes the formation of a discharge electron avalanche. A recording device, for example a photo camera, is positioned on the side of the transparent electrode to record the discharge. The information carrier in the known method is the photo image of the discharge electron avalanche whose shape allows evaluation of the spatial inhomogeneity of the gas emission through the surface of the article and to determine the defect, leak, or flaw size and location.

A limitation of the known method is the necessity to bathe the test article in a test gas. This complicates the testing process and excludes its application for the articles with interior volume that is filled with a working medium featuring specified properties.

There are also other known methods of nondestructive testing that do not require any test gas usage and that allow determination or detection of article faults on the basis of gas discharge visualization. According to these methods, the article being tested and the recorder, in the form of a liquid crystal cell, are placed between the electrodes, while a high voltage is applied to the electrodes, and the article is subjected to an applied electric field with field lines (vector) being normal to the article surface. The test results are indicated by the image of the gas discharge process recorded by the registration unit.

The presence of a fault is indicated by a change in the form of the gas discharge image caused by a distortion of the normal component of the electric field within the fault area. To improve the indicating potential of the test, the air gap between the article and the recording unit is maintained within the 50-100 μm range.

The character of the gas discharge image is a function of the thickness and dielectric permeability of the layers that confine the gas discharge gap, while the shape is determined by the shape of the article and is comprised of separate film exposure spots whose quantity per surface area unit is determined by the amplitude and number of pulses during the exposure to a high voltage electric field. The film exposure is caused by the avalanche-like discharge processes that linearly propagate along the electric field lines of force from the separate points of the object to the image recording unit. The discharges appear at random points of the object uniformly over the whole surface area of the gap. The presence of faults on the surface or in the volume of the article results in a distortion of the electric field symmetry in the gas discharge gap. This is reflected in the shape of the gas discharge image.

In such case, an increase in the electric field strength causes a preferential and most intensive development of avalanche-like discharges in this field, while its decrease leads to discharge weakening. Therefore the defective area will be exposed on the recording unit either more lightly or more strongly in comparison to the background, that is, to the defect-free areas. The testing sensitivity is a function of the electric field strength in the defective and defect-free areas.

A common limitation of the conventional methods is their low sensitivity in testing of articles that have outer electrically conducting layers that drastically reduce the indicating potential of the testing according to the value of the change in the normal electric field component within the defective area of the article.

There is a known method of recording air discontinuities in a solid body wherein an article being tested is placed between the electrodes to which high voltage is applied, while a glow is caused in the discharge gap, the character of the glow reflecting the inner structure of the article. The discharge glow is recorded on the photo carrier.

To determine the size of the air space in the direction of the electric field lines of force the discharge photography is carried out in two stages. While a picture is taken at the threshold of the discharge ignition, the value of the applied voltage is recorded, whereupon the voltage on the electrodes is continually increased up to a value at which a discharge occurs in the air volume of the defect that is reflected on the film. In this case the defect image will be brighter than in defect free areas.

By recording the value of the applied voltage and comparing it with the voltage at which the first picture was obtained, information is gained on the presence of defects and their location in the direction of the electric field lines of force. A disadvantage of this known method is the high error in determining the voltage values of the discharge ignition in the fault space. This substantially lowers the sensitivity of the test.

There is also a method of nondestructive testing for faulty adhesion in thin layer metal-dielectric arrangements in which the metallic substrate of the article is used as one of the electrodes. A photographic film or photo carrier is laid over the dielectric layer with the emulsion layer facing the article surface. The whole system is pressed with a roller that is rolled along the article surface, while voltage is supplied from a high voltage impulse generator to the roller functioning as a positive electrode.

After exposure the photo material is processed using a conventional photographic printing method. In such case an appearance of a fault that is of an air interlayer between the metallic substrate and the dielectric coat of the article leads to a reduction in the field strength on the outer surface of the article and, correspondingly, to weakening of the discharge that appears in the faulty area. These areas will be brighter in comparison to the defect-free areas. The sensitivity of the known testing method is determined by the character of the distribution of the normal electric field component above the surface of the article being tested and by the relationship between the faulty adhesion value and the dielectric coat thickness.

A disadvantage of this method is the requirement that a gas discharge gap be formed on the side of the dielectric layer of the article, thus precluding the possibility of its usage for articles with a metallized layers. The sensitivity of this method is low because only the normal component of the electric field will operate within the non-adhesion area.

SUMMARY OF THE INVENTION

The method of the present invention is based on gas discharge visualization of the inner structure of the article being tested by applying thereto a high voltage electric field. This phenomenon is known as the Kirlian effect. Studies carried out by several authors have shown that a necessary and sufficient condition for the realization of the gas discharge visualization is the provision of a discharge gap around the article, excitation and recording of the gas discharge image generated therein when the article is subjected to a high voltage electric field.

The main purpose of the invention is to improve the method of tightness testing by means of gas discharge visualization through forming an optimum directed gas discharge process independently on the conductivity of the outer layer of the article being tested. This effect is achieved by subjecting the article to the action of a superimposed electric field having both normal and tangential components.

With the purpose of obtaining new useful results, the method of the present invention for nondestructive non-contact tightness testing based on gas discharge visualization includes subjecting the article being tested to a high voltage impulse electric field formed between a positive electrode and a metallic layer of the dielectric article casing. The image that appears as a result of the gas discharge process is recorded on a photo carrier. According to the invention, an article is placed on a dielectric plate arranged on a positive electrode the surface area of which is selected in relation to the surface area of the article in a ratio not less than 7:1. The article is additionally influenced by an electric field of the preliminary polarized dielectric plate arranged between the positive electrode and the article being tested, while the ratio between the surface area of the dielectric plate and the surface area of the positive electrode is selected within 1.2:1. The plate is arranged symmetrically to the center of the positive electrode. The dielectric plate is preliminary polarized by not less than three high voltage pulses of 100-120 sec modulated by 200-300 kHz frequency.

The different surface areas of the article being tested, the positive electrode and the dielectric plate provide conditions for the appearance of the tangential component of the electric field. It is this component that provides the formation of the discharge glow in the horizontal incomplete fusion areas, and in other horizontal faults of the article. Thus a new property of the method of the present invention achieves a useful purpose.

DETAILED DESCRIPTION OF THE INVENTION

Figure 1:
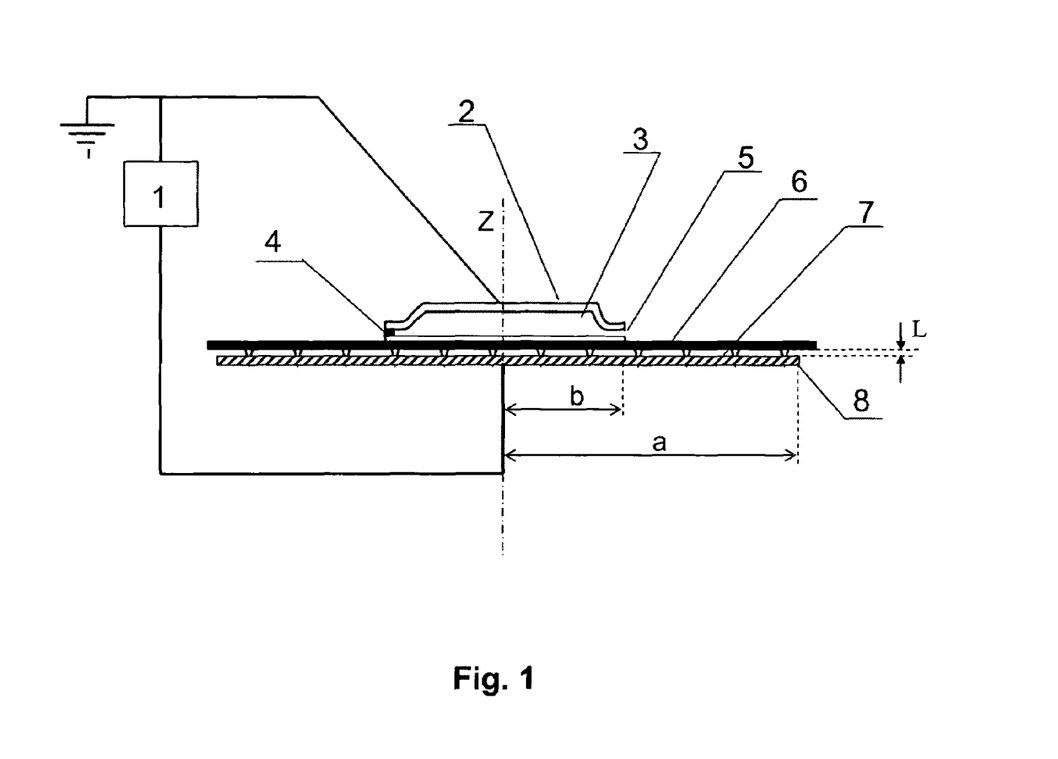
FIG. 1. Schematic diagram for tightness testing of an article with an operating medium welded in a metallized polyethylene casing.

FIG. 1 shows a schematic diagram for a tightness testing system comprising a high voltage pulse generator 1, article with metallized polyethylene casing 2, article operating medium 3, article weld seam area 4, discontinuity (faulty weld) air gap leading to tightness failure 5, X-ray film 6, dielectric polarized plate 7, and an electrode 8 which is referred herein as the "positive electrode" 8.

To demonstrate the correctness of the relationship between the dimensions of the elements in the control circuit, we shall use the Laplace's equation in cylindrical coordinates while presenting all the circuit elements in the calculation circuit as cylindrical for that purpose. The circuit section shown in FIG. 1 seems to remain unchanged in such case. We write the boundary problem in conformity with the figure:

$$\frac{\partial^2 V_i(r,z)}{\partial r^2} + \frac{1}{r}\frac{\partial V_i(r,z)}{\partial r} + \frac{\partial^2 V_i(r,z)}{\partial z^2} = 0. \tag{1}$$

Equation (1) is Laplace's equation $\Delta\phi=0$ written in the cylindrical system of coordinates taking into regard the cylindrical symmetry of the system for the purpose of the calculations. Values r, $\phi$, z are coordinates in the cylindrical system of coordinates The value $\epsilon$ is the dielectric constant, b, a, l are dimensions of electrodes and dielectric thickness respectively, V is the potential value on the lower electrode, and U is the applied difference in electrical potential.

The boundary conditions required for solving the equation are listed below:

1. equality of the potentials on the dielectric plate surface—

$$V_1(r,l)=V_2(r,l), b<r<a$$

$$V_1(r,l)=V_2(r,l)<a \tag{2}$$

$$V_1(r,o)=V_2(r,o)<a \tag{3}$$

2. equality of the normal components of the inductions on the dielectric plate surface—

$$\varepsilon\frac{\partial V_1}{\partial z} = \frac{\partial V_2}{\partial z} \qquad b<r<a, z=l \tag{4}$$

$$\varepsilon\frac{\partial V_1}{\partial z} = \frac{\partial V_2}{\partial z} \qquad o<z<l, r=a$$

3. conditions of potentials constancy and for the applied difference of potentials—

$$V_1(r,o)=V_2(r,o)=V_o, <a$$

$$V_1(r,l)=V_2(r,l)=V_o+U, r<b \tag{5}$$

As it is impossible to obtain analytical expressions the task is solved numerically. The calculations are performed for the dimensions of the upper electrode b=2 cm, while the dielectric layer thickness is 3 mm.

The calculations were performed for the values of dielectric constant $\epsilon$=5 and 20, and in this case there was not any substantial dependence of the field at that value. All the data is normalized to the value of the applied difference of potentials U. This allows obtaining the true field strength value (its radial component) as a function of the applied voltage.

Figure 3:
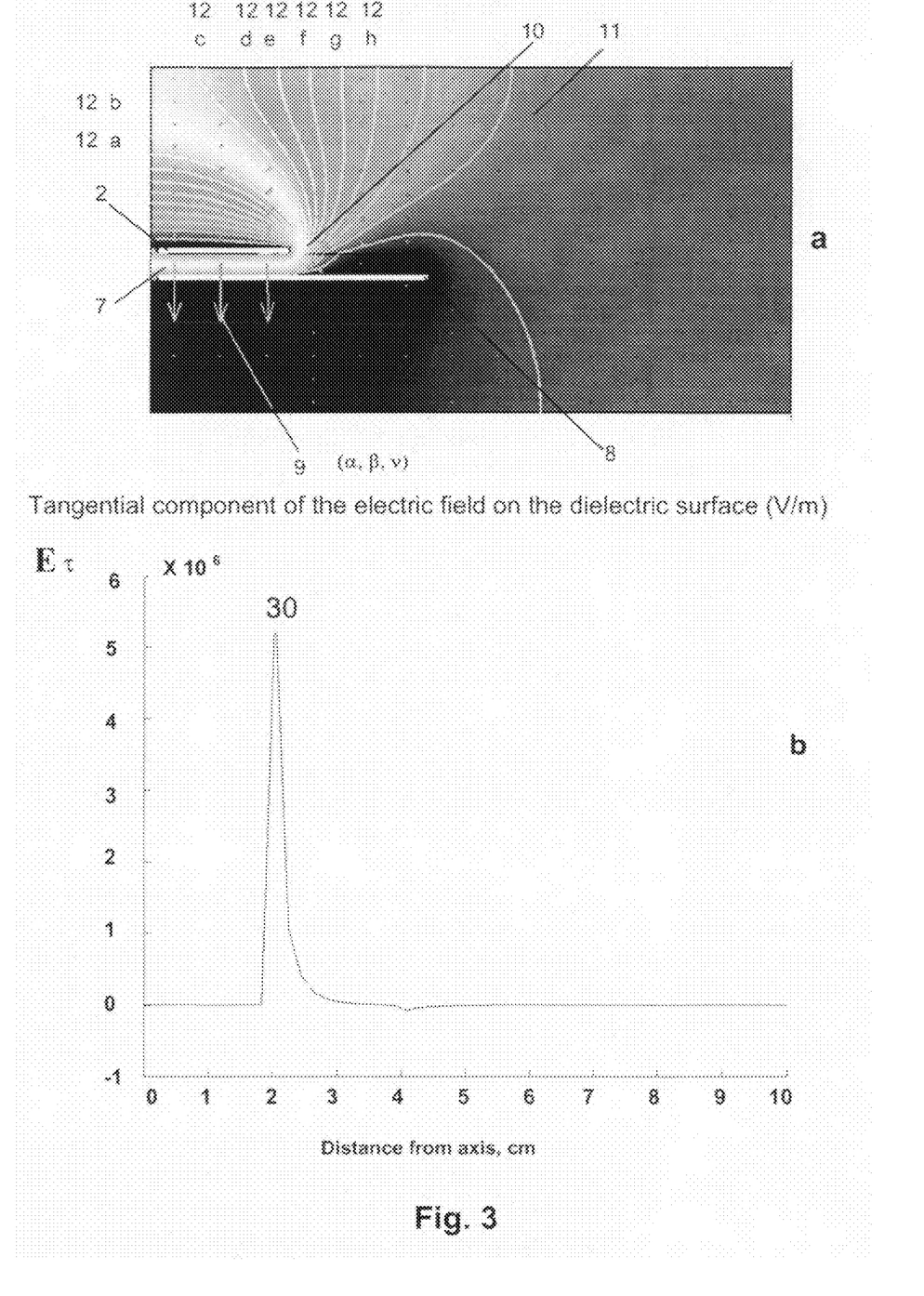
Figure 4:
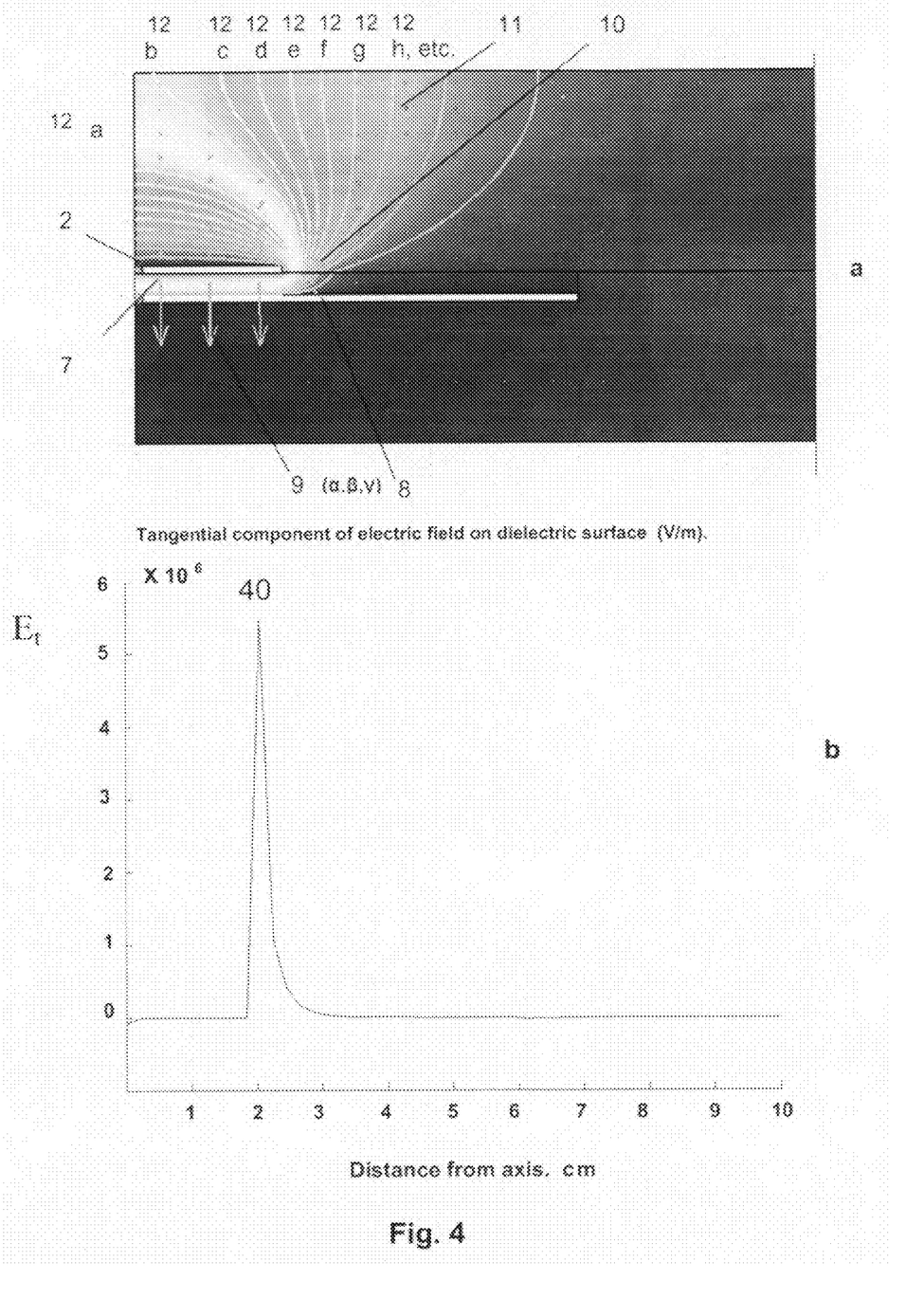

If the article being tested has no defects in the weld seam area, the electric field is equipotential in the active zone. Therefore, the distribution of the electric potential per special programs was calculated for the active zone section and is shown in colors in FIGS. 2, 3, and 4, where the lines are drawn with a vector of equal potentials. Lower in the same figures the results are shown of the numerical calculation for the tangential component of the field along the radial coordinate for r=b on the dielectric plate surface. The designations on the axes of FIGS. 2, 3, and 4 are identical for a) and b) and are shown on b).

Figure 2:
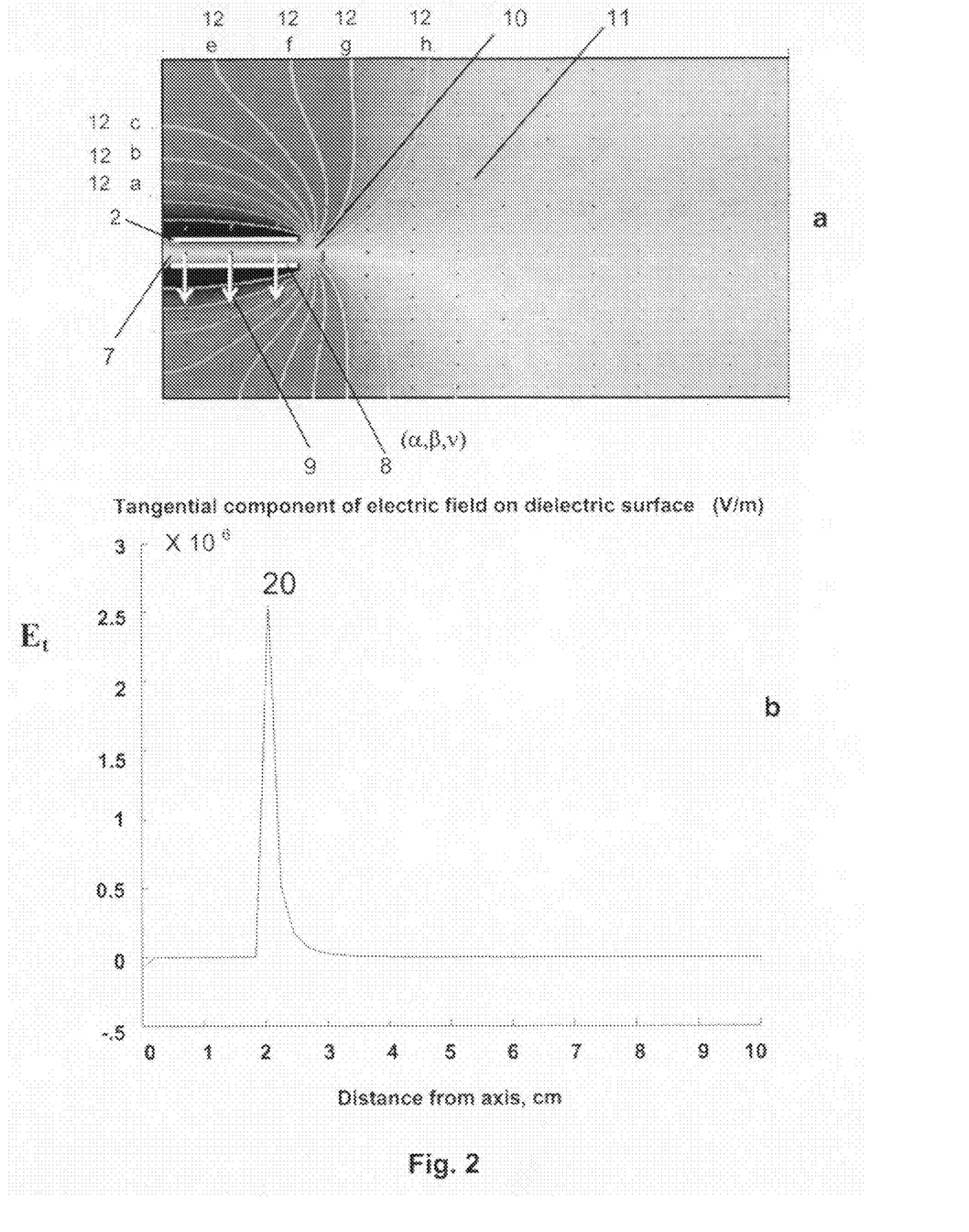
FIGS. 2, 3, 4. Distribution of the electric potential on the colored image and of the electric field strength vector in the active zone (2a, 3a, 4a), and numerical distribution of the electric field tangential component on the dielectric plate surface when the lower electrode radius equals 2 cm (FIG. 2), 4 cm (FIG. 3), 6 cm (FIG. 4), respectively.

In FIGS. 2a, 3a, 4a the right half of the system is shown in flat cross-section Z-X, the half being presented entirely in FIG. 1. The co-ordinates: X=0 and Z=0 in FIG. 2 correspond to these co-ordinates in FIG. 1. The designation numbers in FIG. 2 correspond to those in FIG. 1. For the parts not indicated in FIG. 1, additional designations were assigned. Thus, the following designations are presented in FIG. 2a, 3a, 4a:

2. the controlled article,
7. dielectric polarized plate with length—L (cm.),
8. positive electrode,
9. ($\alpha$, $\beta$, $\gamma$) vectors of the normal component of electric-field stress-level inside the gap between the controlled article and the electrode
10 the direction of the vectors of electric-field intensity in the zone of a welded seam (welded seam zone—position 4 on FIG. 1), This zone is active in relation
11. the dashed grid is provided for determination of positive electrode's length and that of the controlled article in sectional view in cm,
12. projection lines (a, b, c, d, etc.) in cross-section Z-X of unipotential surfaces of electric field intensities.

On abscissa axis on FIG. 2a,3a, 4a, one can fix numerical value of the controlled article's (2) and the positive electrode's (8) length in centimeters.

FIG. 2a, 3a, 4a are different due to different ratio between the examined sample's length and that of the positive electrode.

Shown in FIG. 2a are sectional views of unipotential surfaces of electric-field intensities (12), shown by arrows are the vectors of electric-field intensity in the active and neighboring zones when dimensions of the object being examined and those of the positive electrode are equal.

Shown in FIG. 3a are sectional views of unipotential surfaces of electric-field intensities 12a, 12b, 12c, etc., shown by arrows are the vectors of electric field intensity in the active and neighboring zones when dimensions of the object being examined are two times smaller then those of the positive electrode. One can see in FIG. 3 that lines of unipotential surfaces of electric-field intensity are positioned closer to the ordinate axis Z in comparison with FIG. 2a.

Shown in FIG. 4a are sectional views of unipotential surfaces of electric-field intensities 12a, 12b, 12c, etc., shown by arrows are the vectors of electric field intensity in the active and neighboring zones when dimensions of the object being examined are smaller than those of the positive electrode.

One can see in FIG. 4a that electric-field unipotential surfaces (lines—7 in cross-section Z-X) are positioned closer to the abscissa axis X in the active zone in comparison with FIGS. 2a and 3a and they are characterized by higher concentration on the surface of the polarized dielectric plate.

In graphs 2b, 3b. 4b characterizing signal value was marked on ordinate axis. As it was mentioned above, characterizing signal value equals the numerical value of intensity of electric-field tangential component which is normalized according to the value of the potential difference applied. Marked on the abscissa axis is the distance in cm from the middle of the object being examined.

By using the normalized intensity-value of electric-field tangential component as characterizing signal, one can obtain the true value of the radial component as the function of the applied voltage. The term "radial component" is used, since, a cylindrical-co-ordinate equation is used in order to prove legitimacy of the ratio of the calculated control-circuit components' dimensions.

Upon comparison of the data presented in FIGS. 2b, 3b, and 4b, one can see that the characterizing signal value, i.e. the numerical value of electric-field tangential-component, depends on the ratio between the examined sample's length and that of the positive electrode in cross-section Z-X. The characterizing signal value increases, as the positive electrode is enlarged.

Let us consider this in detail. In FIG. 2b the dimensions of the controlled article and the positive electrode are equal. In FIG. 2 one can see that the value of tangential-component of electric-field intensity in the active zone (zone where hermetic sealing of component is ensured) equals 2.5 units.

In FIG. 3b the dimensions of the controlled article's boundary are two times smaller than those of the positive electrode. Here the characterizing signal value increases to reach the value of 5.7 units. In the graph of FIG. 4b the characterizing signal value reaches the value of 5.85 units.

One can see that as soon as the length of the positive electrode reaches 4 cm, its area being two times greater than that of the controlled article, the value of tangential-component of electric-field intensity nearly reaches its maximal value of 5.7 units of its absolute value normalized to the applied potential difference.

In FIG. 4a the same parameters are shown but the positive electrode's length used for the calculations and shown in FIG. 4b equals 6 cm. In this FIG. 4b one can see that electric-field unipotential surfaces (lines—7 in cross-section Z-X) are positioned closer to the abscissa axis X in the active zone and they possess a higher concentration on the surface of the polarized dielectric plate. On the graph of FIG. 4b the value of tangential-component of electric-field intensity in the active zone (welding zone) equals 5.85 units of its absolute value normalized to the applied potential-difference. That is an increase of the positive electrode's area that is greater than double causes a much lesser increase of the value of tangential-component of electric-field intensity initiating high-voltage discharge in the zone of faulty fusions of a horizontally positioned welding seam.

Figure 5:
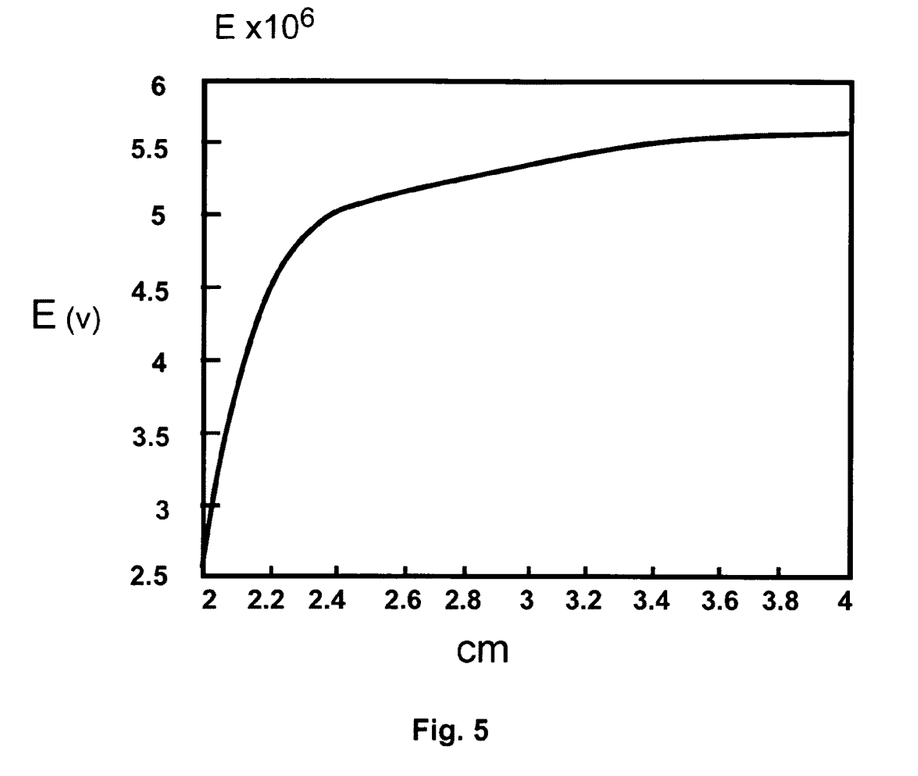
FIG. 5. Influence of an increase in the lower electrode surface area on the tangential component value of the electric field on the dielectric plate surface.

Shown in FIG. 5 is the calculated graph of growth of the value of tangential-component of electric-field intensity, the tangential-component being normalized to the value of the applied potential-difference and the positive electrode's length constantly increasing, The graph was calculated up to the length increase of 4 cm for the above reason and due to complexity and lengthiness of calculation. Numerical values of the positive electrode's length from the active zone of the controlled article were marked on the abscissa axis.

An estimate of the input of the macroscopic polarization $P_0$ of the dielectric plate into the radial component of the electric field strength tangential component.

In this case the dependence of the value $P_0$ on the applied field is supposed to be known (of course, it does not depend on the value of the dielectric constant $\epsilon$ in the dielectric, and moreover, the input of the inducted polarization part in $P_0$ should be neglected).

The potential of the polarized dielectric is known to be determined by the expression (taking into regard the cylindrical symmetry):

$$\varphi(r,z) = \int\int\int \frac{PR}{R^3} dV^1 \quad (6)$$

where $R=r-r^1$, r and $r^1$—the points of monitoring and outflow. By writing this integral in the cylindrical system of coordinates and integrating one time with respect to z' we obtain logarithmically divergent integrals:

$$\varphi(r,z) = P\left[\int_0^{2\pi}\int_0^a \frac{r'\,dr'\,d\vartheta'}{\sqrt{r^2+r'^2-2rr'\cos\vartheta'+l^2}} - \int_0^{2\pi}\int_0^a \frac{r'\,dr'\,d\vartheta'}{\sqrt{r^2+r'^2-2rr'\cos\vartheta'}}\right], \quad (7)$$

where l—is the dielectric plate thickness. Using rather robust mathematical regularization methods that contain several simplifications we shall obtain an expression for the radial component of the field rated to the initial polarization value $P_0$ $$E_r(r,z=l) = \delta\frac{r}{r^2-a^2+\beta(z)} \quad (8)$$

where $\delta$ is a constant of the order of unity, and value $\beta(z) \ll 1$.

As can be seen, as r approaches, the electric field value drastically increases. It should be noted that the system equations were solved in the simplest version in order to show the principal growth of E with the distance increase between the point of value E evaluation and the source where, as shown, it equals 0. As seen from (8), when r approaches a, the field value increases substantially, while along the axis of the polarized plate it equals 0. Such behavior of the field is in full conformity with the system symmetry and proves the correctness of the obtained functional dependence.

The physical mechanism of forming the tangentially directed discharge in the tightness failure area is based on the article and polarized plate emission analysis of such charged particles as electrons and ions that induce the discharge micro-channels. The type of the micro-channels is determined by the operation of the electrons output, article geometry and the surface ratios of the polarized plate, positive electrode and the article being tested. The latter ratio is chosen experimentally for each article type, on the basis of the 7:1 criterion.

Figure 6:
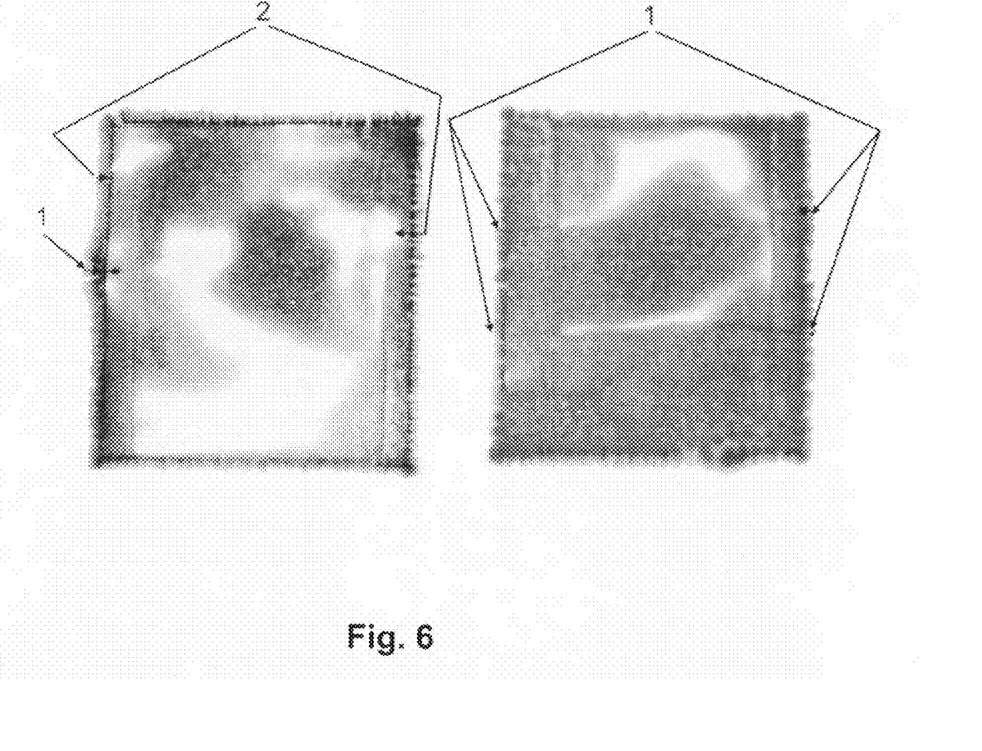
FIG. 6. Gas discharge visualization image on an X-ray film showing the structure of the article being tested that contains artificial defects formed by 100-300 mm diameter steel wire pieces that were inserted in the welding zone of the casing and taken out of the weld seam area after welding.

FIG. 6 shows artificial defects 1 and actual faulty fusion defects 2 but with an opening below 100 μm. These defects were not rated according to their size, but when their conventional diameter is below 100 μm it is characterized by the absence of a discharge that causes an exposure of the X-ray film. In the photo picture light traces of air are seen proving that it leaked through these faulty fusion areas into the previously evacuated welded volume.

In FIG. 6 images of two controlled articles are shown on X-ray film. Sections of steel wire of Ø 100-300 мкм were implanted in the article in the zones of welded seams and then extracted along the perimeter from the zone of a welded seam after article's welding. Thus, artificial faulty fusions emerged in their places (marked by number 1). The article was evacuated before welding (according to the technology of battery production). Therefore, after extraction, air was sucked in with vacuum first from the left and then from right of steel wire sections, from the left to the inside of the articles. It can be seen well in FIG. 6 (light protuberances). On the right side, wire was extracted after extraction of wire sections on the left side, and vacuum was almost not there. Therefore, on top right one can still see traces of air sucked with vacuum into the battery, whereas the air is already gone at the bottom.

After application of high-voltage discharge voltage, high-voltage discharge took place in the artificial defects. The discharge was accompanied by glow. Therefore, the film was spoiled by light under the zones of artificial faulty fusions. In the picture, these defects can be seen as black stripes. And in the zones of air penetrating the battery and generating air bags, there occurred no discharge due to their big size. In the picture they can be seen as white protuberances.

One artificial defect was implanted in the article b in FIG. 6 (it can be seen in the fig. on bottom left in the seam with great quantity of air sucked with vacuum into the battery after extracting of the wire from the welded seam. In FIG. 6b one can also see well natural defects detected in the course of battery control through this method (they are marked with number 2).

The tightness testing method that is being applied according to the present invention permits reduction in testing labor. The method also expands the range of its usage to articles for which any introduction of foreign matter into the working medium is inadmissible (for instance, gas purging), and to provide a new useful quality—the possibility of a gas discharge visualization of tangentially oriented faults with small openings in thin layer weld seams.

A method of nondestructive non-contact tightness testing based on gas discharge visualization according to the present invention can be practiced in the following particular exemplary way:

Step one:
the surface area of a flat power source article is calculated and a flat metallic positive electrode is selected taking into account that their surface areas to be in the ratio of about 7:1.

Step two:
a dielectric plate is selected proceeding from the ratio of its surface area and the positive electrode surface area to be 1.2; 1, and it is placed on the positive electrode symmetrically to the center of the positive electrode so that the positive electrode is to be completely covered.

Step three:
the positive electrode is subjected to a series of high voltage pulses that polarize the dielectric plate.

Step four:
the dielectric polarized plate is covered with an X-ray film placed in a black paper pack with the emulsion layer facing the surface of the article being tested.

Step five:
  the article to be tested is placed at the center of the on the X-ray film, its metallized surface is electrically grounded, and a series of high voltage pulses is applied to its positive electrode.

Step six:
  Subsequently, the film is taken out of the pack and subjected to conventional photo processing for development and fixing.

In accordance with the above listed operations and steps, the method was tested on samples of the articles containing inside a multiple layers of working medium in the shape of rectangular briquettes welded into a metallized polyethylene film. The width of the weld seam was 5 mm, the film thickness was 0.2 mm. Sealing defects, or defects in tightness were generated by welding in the weld seam of 100-300 mm diameter steel wire pieces which were then taken out of the weld seam. A practical study permitted optimization of the process parameters of the preliminary polarization of a dielectric plate, and it was found that the most optimal is polarization of the dielectric plate was obtained by not less than three pulses of 100-120 µsec duration modulated at a frequency of 200-300 kHz.

The presence of defects on the photographic picture (FIG. 6) was determined by an expert appraisal performed by certified flaw detection operators. The diameter of the minimum detectable faulty fusion exposed by avalanche discharges was 100 µm.

Thus, the proposed method permits to detect $\geq 100$ µm faulty fusion discontinuities in thin layer weld seams, thus providing tightness testing of articles with a working medium welded into a metallized polyethylene film in the process of manufacturing, during finishing of technological processes, and during storage and operation.

The basic modes and operations of the method of the present invention will permit determination of the tightness of self-contained chemical power sources and other devices of similar design.

While various embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method of nondestructive noncontact tightness testing of inner structure of articles based on gas discharge visualization, comprising the steps of:
  providing a film for imaging on a dielectric plate and an electrode, said dielectric plate disposed on said electrode;
  polarizing said dielectric plate by applying a series of high voltages pulses across said dielectric to provide a preliminary polarized dielectric plate;
  after said polarizing step, arranging an article to be tested having a multi-layer casing including an outer metallic layer on said film;
  subjecting the article to a high voltage pulsed electric field by applying a high voltage electrical pulse between said electrode and the said outer metallic layer and said electrode, wherein said pulsed electric field is combined with an electric field associated with said preliminary polarized dielectric plate triggers a gas discharge process, and
  obtaining an image on said film of an interior structure of said article based on said discharge process.

2. A method of nondestructive noncontact tightness testing according to claim 1, wherein a ratio between the surface area of the dielectric plate and the surface area of the positive electrode is selected within 1.2:1, and the plate is arranged symmetrically relative to the positive electrode center.

3. A method of nondestructive noncontact tightness testing according to claim 1, wherein said polarizing step comprises at least three high voltage preliminary pulses.

4. A method of nondestructive noncontact tightness testing according to claim 3, wherein said high voltage preliminary pulses have a 100-120 µsec duration at a frequency of 200-300 kHz.

5. A method of nondestructive noncontact tightness testing according to claim 1, wherein a surface area of said electrode is in a ratio to a surface area of said article by at least 7:1, said dielectric plate having a surface area different from said surface area of said electrode and said article.

* * * * *